United States Patent

[11] 3,582,741

| [72] | Inventors | Harold D. Arnold<br>Bellefontaine Neighbors;<br>John G. Lewis, Saint Louis County, both of |
|---|---|---|
| [21] | Appl. No. | 794,493 |
| [22] | Filed | Jan. 28, 1969 |
| [45] | Patented | June 1, 1971 |
| [73] | Assignee | Emerson Electric Co.<br>St. Louis, Mo. |

[54] BRAKE SYSTEM FOR ELECTRICAL MOTORS
8 Claims, 6 Drawing Figs.

[52] U.S. Cl. ................................................ 318/209,
310/77, 318/371
[51] Int. Cl. ........................................................ H02p 3/18
[50] Field of Search ........................................... 310/77;
318/209, 370, 371, 379, 380

[56] References Cited
UNITED STATES PATENTS
| 2,827,136 | 3/1958 | Sorchy | 310/77X |
| 3,038,109 | 6/1962 | Mowery, Jr. et al. | 318/37X |

*Primary Examiner*—Oris L. Rader
*Assistant Examiner*—Gene Z. Rubinson
*Attorney*—Polster and Polster

ABSTRACT: In a capacitor start motor, a centrifugal actuator, acting upon a balanced but floating plate serves a double function of start-winding switch actuator and mechanical brake. A switching arrangement provides smooth dynamic braking until the mechanical brake is actuated.

INVENTORS
HAROLD DAYNE ARNOLD
JOHN G. LEWIS

ATTORNEYS

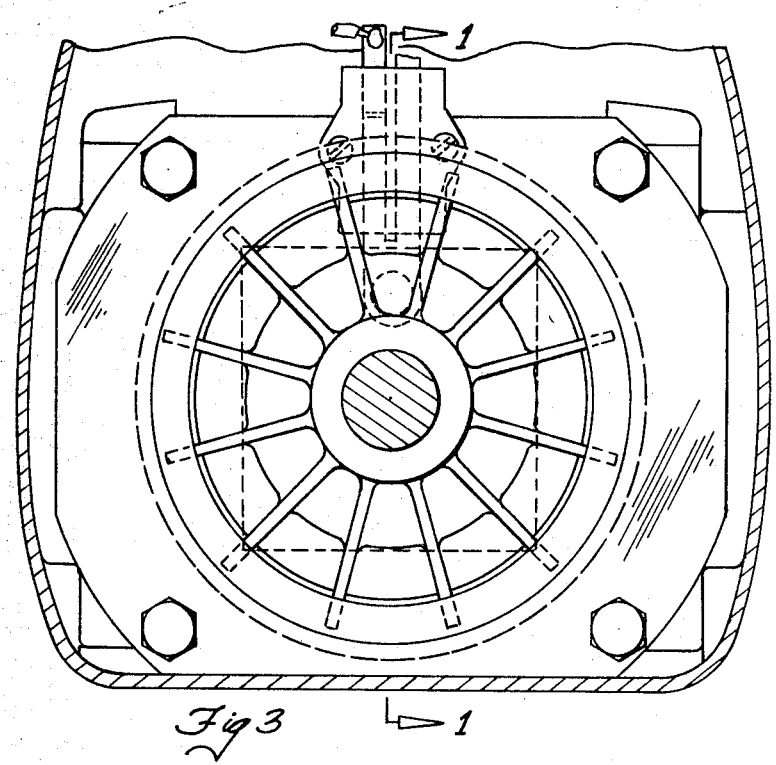
Fig 3
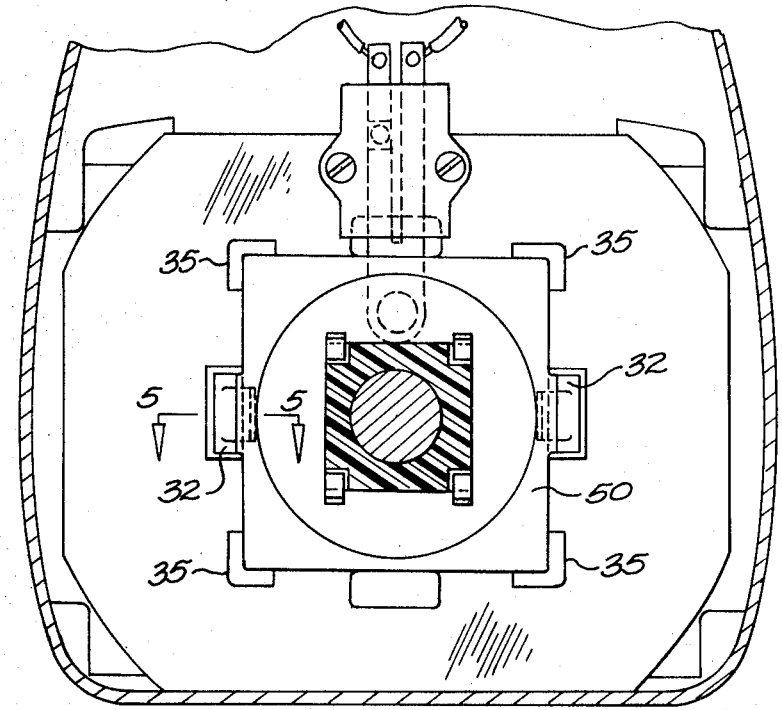
Fig 4
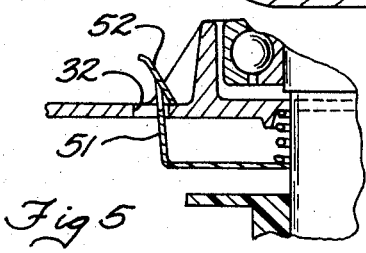
Fig 5
INVENTORS
HAROLD DAYNE ARNOLD
JOHN G. LEWIS
By
ATTORNEYS

INVENTORS
HAROLD DAYNE ARNOLD
JOHN G LEWIS

By Polah and Polah
ATTORNEYS

BRAKE SYSTEM FOR ELECTRICAL MOTORS

BACKGROUND OF THE INVENTION

In many applications, for example, radial arm saws, of capacitor start motors, particularly those equipped with ball bearings, a need has long been recognized for stopping the rotation of the motor shaft promptly after the on-off switch has been thrown to off position.

A discussion of the problem and one form of solution are to be found in Mowery et al. U.S. Pat. No. 3,038,109.

In the Mowery et al. patent, a voltage responsive relay is employed in a circuit which provides dynamic braking, and which also serves to deenergize the starting winding. A separate centrifugally operated mechanical brake, bearing against a flat face of an annular hub of an end shield, serves to brake the rotor and shaft when the dynamic brake has reduced the speed to a predetermined level. In the Mowery system, the centrifugal brake is accurately aligned and the voltage responsive relay responds to voltage generated in the braking cycle.

Of course, dynamically braked capacitor start motors with centrifugal actuators have inherently combined the dynamic braking and a certain amount of centrifugally controlled mechanical braking, since the centrifugal actuator has moved into frictional engagement with a switch arm when the speed of rotation of the shaft has been reduced to the place at which the actuator moves to throw out the start winding.

One of the objects of this invention is to provide a simple, economical, smoothly decelerating brake system for capacitor start motors.

Other objects will become apparent to those skilled in the art in the light of the following description and accompanying drawing.

SUMMARY OF THE INVENTION

In accordance with this invention, generally stated, a capacitor start electric motor having a main winding, a start winding, a capacitor electrically connected to the start winding, a rotor shaft and a fixed part adjacent the rotor shaft is provided with a braking system which, in its entirety, includes a dynamic brake and a mechanical brake. The mechanical brake includes a plate mounted floatingly within limits about the rotor shaft, means on the fixed part of the motor for restraining rotational and axial movement of the plate beyond those limits, braking means mounted on the shaft for rotation with the shaft and for axial movement with respect to the shaft and located with respect to the plate to move into and out of engagement with the plate, and a starting switch electrically connected to the capacitor and in the dynamic braking circuit, the starting switch having an operating arm adapted to be moved in response to movement of the plate to open and close the switch.

In the preferred embodiment, the plate totally embraces the shaft but is spaced from the shaft and is spring biased toward the braking means, and the braking means is spring biased toward the plate with a force greater than the bias of the plate toward the braking means.

Also, in the preferred embodiment, the dynamic brake system includes a double-pole, double-throw on-off switch with two poles and two pairs of contacts. One of the poles is electrically connected to one end of the main winding and to the capacitor by way of the starting switch. The other pole is electrically connected to the other end of the main winding. The contacts of one pair of contacts are electrically connected to two wires of a source of power, and one of the contacts of the other pair of contacts is connected to the capacitor. The other contact of the second pair is, for the purposes of this invention, dead.

The mechanical brake portion of the system permits the use of a simple, rugged single-pole mechanical starting switch, and a centrifugal actuator of presently used, thoroughly proven type. The dynamic brake of the present invention insures that during the braking period the main winding, start winding and capacitor are shorted continuously, so that the braking is uninterrupted and chattering eliminated.

BRIEF DESCRIPTION OF THE DRAWINGS

In the drawing.

FIG. 3 is a fragmentary sectional view taken along the line 3-3 of FIG. 1;

FIG. 4 is a fragmentary sectional view taken along the line 4-4 of FIG. 1;

FIG. 5 is a fragmentary sectional view taken along the line 5-5 of FIG. 4; and

DESCRIPTION OF THE PREFERRED EMBODIMENT

Figure 1:
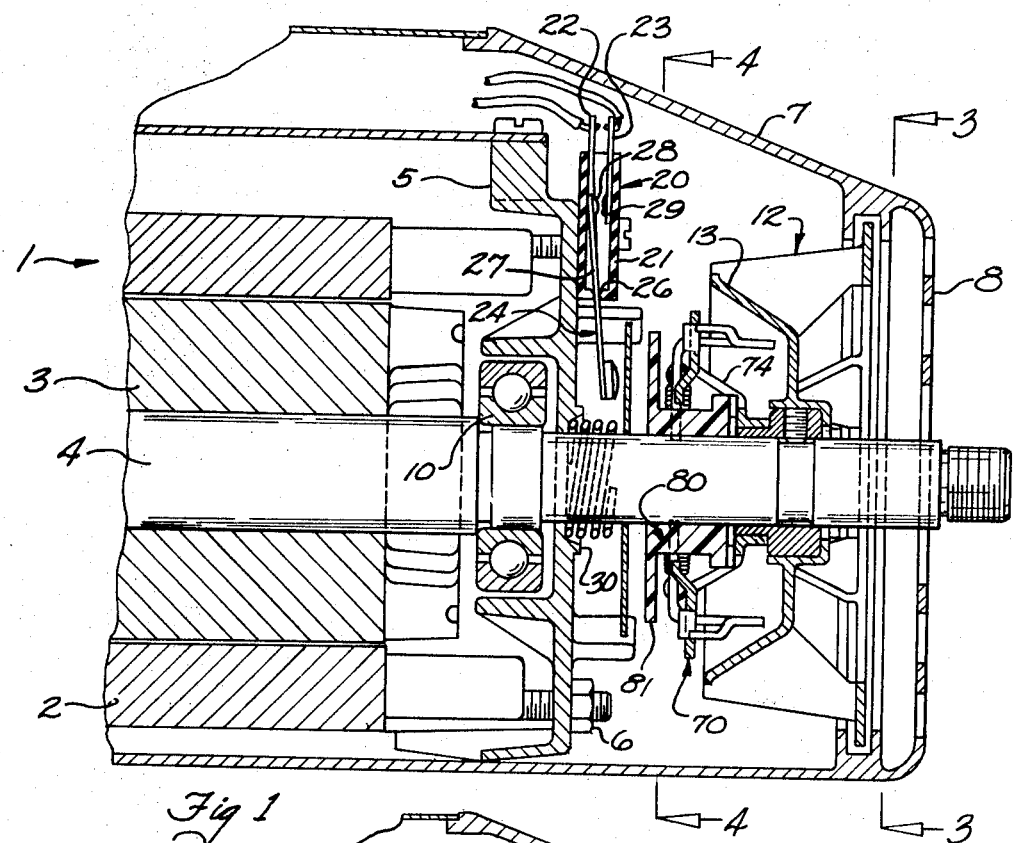
FIG. 1 is a fragmentary sectional view taken along the line 1-1 of FIG. 3, showing one illustrative embodiment of braking system of this invention, and particularly the mechanical brake, in running condition.

Referring now to the drawing for one illustrative embodiment of brake system of this invention, reference numeral 1 indicates a conventional single-phase capacitor start AC motor, with a stator 2, a rotor 3, a rotor shaft 4, end shields 5, of which only one is shown, and shell 7. The end shields 5 are mounted in fixed relation to the stator 2, in the embodiment shown, by means of throughbolts 6. The end shield 5 carries ball bearings 10, in which the shaft 4 is journaled. The shell 7 has a grille 8 and an inwardly opening annular channel within which a flange of a bladed blower 12 projects. The blower 12 is mounted on the rotor shaft 4 by means of a setscrew; the blower 12 has a dished web section 13. All of these elements, except for certain modifications of the axially outer face of the one end shield 5 shown, are conventional.

On the one of the end shields 5 which is shown, a starting switch 20 is mounted. The starting switch 20 has a case 21, through the top of which two terminals 22 and 23 extend and from which the terminals 22 and 23 project. The terminal 22, in the embodiment shown, is one leg of a bifurcated switch arm 24, a broad tongue of which extends through and beyond an opening in the bottom of the case 21 defined by fulcrum ledges 26. A pad 25 of electrically insulating material is mounted on the outer flat side, with respect to the motor, of the tongue at the radially inner end of the arm. An electrical switch point 28 on the outer face of a short leg 27 of the arm 24 within the casing is arranged to move into and out of electrical contact with a point 29 which is electrically connected to the end of the terminal 23 inside the case.

Figure 2:
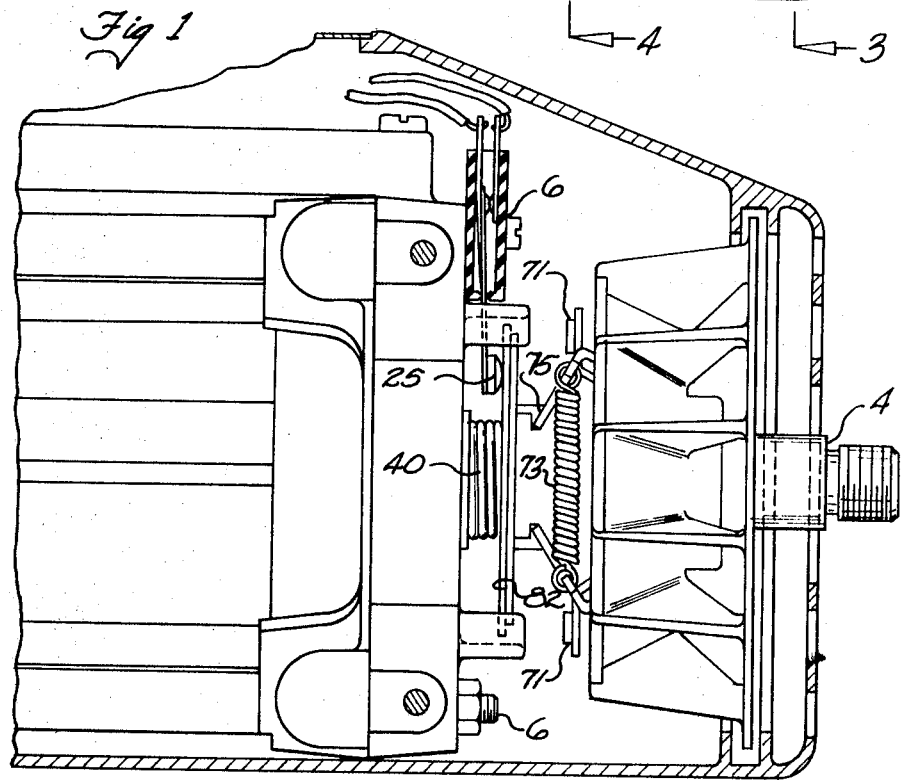
FIG. 2 is a fragmentary view partly in section and partly in side elevation of the device shown in FIG. 1, in static position.

The end shield 5, as shown in FIGS. 1, 2 and 4, is not only tapped to receive a pair of screws by which the switch 20 is mounted, but, in this embodiment, is provided with a shallow well 30, a pair of diametrically oppositely disposed rectangular openings 32, and four guide angles 35 cast integrally with the end shield and projecting axially outwardly therefrom. Each of the guide angles 35 has legs at right angles to one another, and the guide angles are so positioned as to define corners of a square. A helical spring 40, loosely surrounding the shaft 4, is seated at one end in the well 30 and bears at its other end against a square plate 50.

The plate 50 is relatively thin, but rigid, with two, broad, plane, parallel sides, and a hole in its center large enough to receive the shaft 4 with clearance, but small enough to permit the spring 40 to bear on the plate entirely around the hole. The plate 50 has a pair of ears 51 bent perpendicularly from two sides, and of a size to slide within the rectangular openings 32 in the end shield. The ears 51 have tabs 52 lanced from them, as shown particularly in FIG. 5. The tabs 52 project inboard of the inner edge of the openings 32. The resilience of the material of which the plate is made is sufficient to permit the tabs 52 to be snapped over the edge of the openings 32 and to snap back to serve as limiting means for the axially outboard movement of the plate in response to the bias of the spring 40. The dimensions of the plate 50 are such as to permit the plate to slide easily within the confines of the guide angles 35, but to be restrained by the guide angles from free rotation.

A centrifugal actuator 70 is mounted for rotation on the shaft 4, partly within the confines of the dished web 13, as shown particularly in FIG. 1. The actuator 70 has the usual weights 71, a pair of heavy springs 73, a spider 74, mounted on a hub on the shaft 4, lever arms 75 pivoted to the spider and a spool 80, slidably embracing the shaft 4 and operatively engaged by the lever arms 75. The operating mechanism of the centrifugal actuator is entirely conventional. The spool 80 has a wide annular flange 81 at its axially inner end which provides a broad plane face 82 which is adapted to move into and out of face-to-face engagement with a broad face of the plate 50.

The face 82 may be equipped with any desirable surface. A common phenolic resin used for existing centrifugal actuators has been found suitable. However, a clutch facing material can be interposed between the plate and the face 82, or other material can be used for the face or spool or both. The plate can be of cold rolled steel.

The axial force exerted by the spring 40 is less than the effective force of the springs 73, so that the spool 80 forces the plate 50, against the bias of the spring 40, to an axially inner position determined by the throw of the lever arms 75. The lever arms are moved in the opposite direction by the action of the weights when the shaft 4 has reached a critical speed of rotation, and the spool 80 is pulled axially outwardly to a place at which the face 82 clears the face of the plate 50, the plate 50 being restrained against continued axially outward movement by the tabs 52 of the ears 51.

The arm 24 of the switch 20 is interposed between the end shield and the plate 50, with the insulating pad 25 next to the plate 50, and moves with the movement of the plate 50. When the plate 50 moves axially inwardly, the bending of the arm 24 about the axially inner of the fulcrum ledges 26 moves the switch point 28 into electrical contact with the point 29. When the pad 25 moves axially outwardly in response to the movement of the plate and spool when the motor has reached the critical speed, the arm 24 rocks about the axially outer of the lips 26, to break the electrical contact between the points 28 and 29. It will be seen that the arm 24 and the pad 25 are subject, for all practical purposes, to movement in only one plane. It can also be seen that the actuator 70 serves the double function of brake and starting switch actuator. Within the limits imposed by the guide angles 35 and the tabs 52, the plate 50 floats, which permits it to adjust to any irregularity or disalignment of the face 82 with respect to the axis of rotation of the shaft or with respect to the surface of the plate against which it bears.

Figure 6:
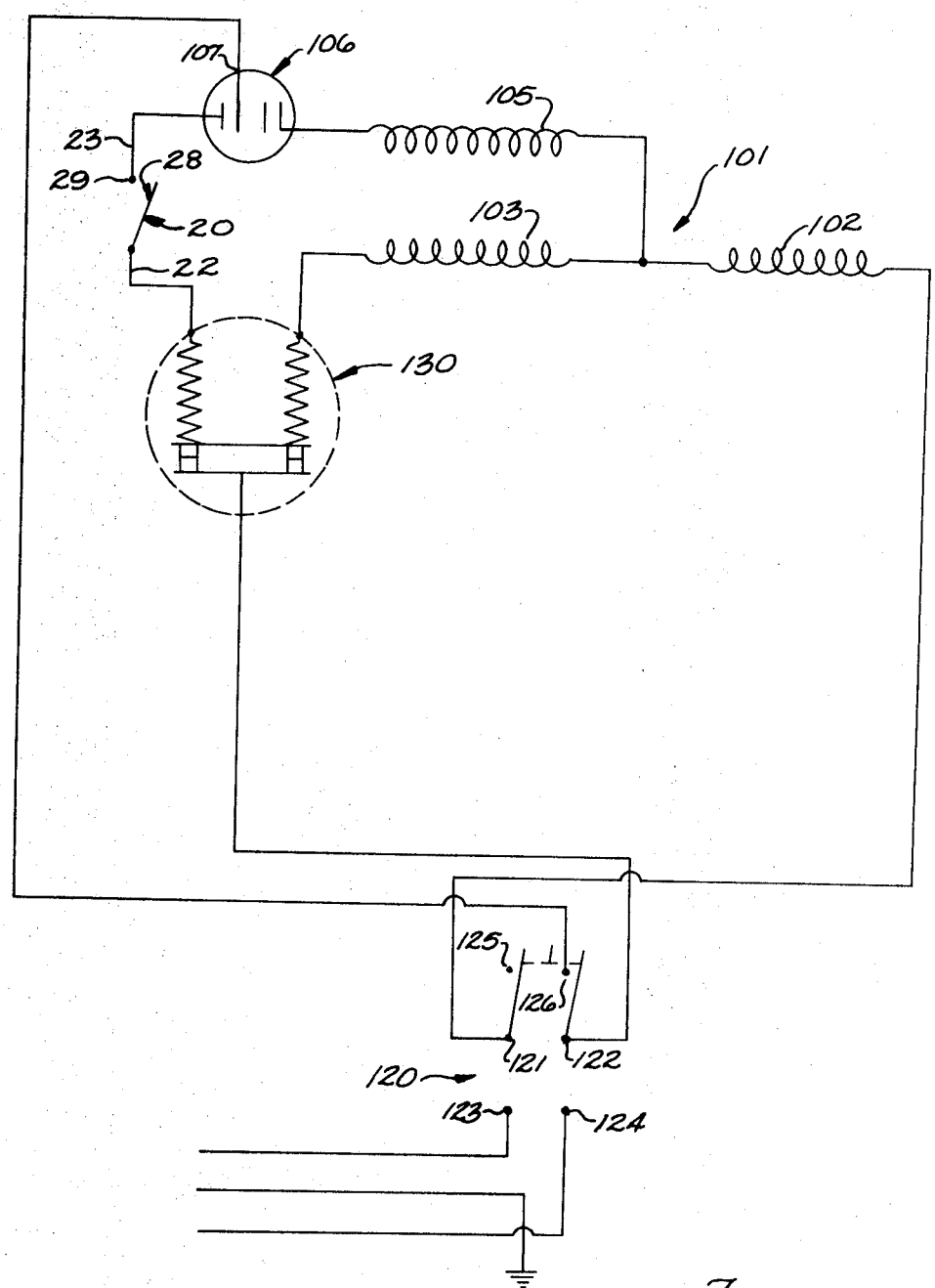
FIG. 6 is a schematic circuit diagram of the preferred embodiment of dynamic braking system of this invention.

Referring now to FIG. 6 for a schematic electric circuit of the dynamic braking portion of the system of this invention, reference numeral 101 indicates a main winding, which, in this embodiment, is divided into two parts, 102 and 103. A start winding 105 is electrically connected to the main winding 101 intermediate the parts 102 and 103. The start winding 105 is also connected to a condenser 106, which is electrically connected to the switch point 29 of the starting switch 20 and, by a tap 107, to one contact 126 of one of two pairs of contacts of a double-pole double-throw switch 120. The switch 120 has two poles 121 and 122 and two pairs of contacts, contacts 123 and 124 constituting one pair, and contacts 125 and 126 constituting the other pair. In the embodiment shown, the contacts 123 and 124 are electrically connected to two hot wires from a source of single-phase alternating current. A third conductor is grounded. For 110 v. operation, one hot wire and one ground may be substituted for the two hot wires of the illustrative embodiment.

The pole 121 is electrically connected to one end of the main winding 101. The pole 122 is electrically connected to the other end of the main winding 101, and, through the starting switch, to the capacitor 106. Both the connection from the capacitor 106 and from the main winding 101 to the pole 122 are by way of a motor protector 130.

In the operation of the dynamic brake, the switch 120 is thrown to close between the contacts 123 and 124 and the poles 121 and 122. The motor starts, because the points 28 and 29 are in electrical contact, the springs of the actuator of the mechanical brake acting upon the spool 80 and plate 50 overriding the bias of the spring 40 and of the arm 24, which has a natural bias toward open position. When the motor reaches a predetermined speed, the brake spool is moved away from the plate 50, permitting the spring 40 to move the plate 50 axially outwardly and permitting the natural bias of the arm 24 to open the starting switch, creating the condition shown in FIG. 6.

When the motor is to be stopped, the switch is thrown to the position at which the pole 122 is electrically connected to the contact 126. In this condition, the part 103 of the main winding, the start winding 105 and the capacitor 106, through the tap 107, are connected in series and short circuited. This produces a continuous dynamic braking until the motor has slowed below the speed at which the bias of the springs 73 overcomes the centrifugal force exerted by the weights 71, and the spool 80 snaps against the plate 50, initiating the mechanical braking which completes the stopping of the motor.

The plate 50 is free to move axially through a greater distance than the throw of the spool 80, so that the centrifugal actuator is permitted to throw out all the way each time. This provides a constant throwout point and simplifies manufacture of the motor.

Numerous variations in the construction of the braking system of this invention, within the scope of the appended claims, will occur to those skilled in the art in the light of the foregoing disclosure. Merely by way of example, the plate may be made differently polygonal, or even round if guide pins are provided, extending through holes in the plate, or some other means is provided for guiding and restraining the plate. The plate may be positioned about the shaft in a straddling rather than a totally embracing posture. Other types of starting switch can be employed, as long as they are responsive to movement of the plate. These are merely illustrative.

Having thus described the invention, what we claim and desire to be secured by Letters Patent is:

1. In a capacitor start electric motor having a main winding, a start winding, a capacitor electrically connected to said start winding, a rotor shaft and a fixed part adjacent the rotor shaft, the improvement comprising a plate mounted floatingly within limits about the said shaft; means on said fixed part for restricting rotational and axial movement of said plate with respect to said shaft beyond said limits; braking means mounted on said shaft for rotation therewith and for axial movement with respect to the shaft and located with respect to the plate to move into and out of engagement therewith; means for moving said braking means axially into engagement with said plate and moving said plate axially beyond the point of engagement when the shaft is rotating below a predetermined rate and for moving said braking means away from said plate beyond the limit of axial movement permitted said plate by the means on the fixed part when the shaft is rotating above said predetermined rate; biasing means urging said plate toward said braking means, and a starting switch electrically connected to said capacitor, said starting switch having an operating arm positioned and adapted to be moved in response to axial movement of said plate to open and close said switch.

2. The improvement of claim 1 wherein the plate biasing means is a spring mounted around said shaft.

3. The improvement of claim 2 wherein the braking means is spring biased toward the plate with a force greater than the bias of the plate toward the braking means.

4. The improvement of claim 3 wherein the plate is polygonal and the restricting means include axially extending guide angles at meeting edges of said plate.

5. The improvement of claim 3 wherein the brake means is centrifugally biased away from the plate when the shaft is rotating.

6. The improvement of claim 1 wherein electrical means operatively associated with the motor provide a dynamic braking system, said means including a double-pole, double-throw, on-off switch having two poles and two pairs of contacts, one of the poles being electrically connected to one end of the main winding and to the capacitor by way of the starting switch and the other pole being electrically connected to the other end of the main winding, the contacts of one pair of contacts being electrically connected to a source of power and one of the contacts of the other pair of contacts being electrically connected to the capacitor.

7. The improvement of claim 2 wherein the axial movement permitted the plate is greater than the effective axial throw of the braking means.

8. In a braking system for a rotary electrical motor having a rotor shaft and a fixed part adjacent said rotor shaft, the improvement comprising a plate mounted floatingly within limits about and around said rotor shaft; means on said fixed part for restricting rotational and axial movement of said plate beyond said limits; braking means mounted on said rotor shaft for rotation therewith and for axial movement with respect to said shaft and said plate and located with respect to the plate to move into and out of engagement therewith; means for moving said braking means axially into engagement with said plate and moving said plate axially beyond the point of engagement when the shaft is rotating below a predetermined rate and for moving said braking means away from said plate beyond the limit of axial movement permitted said plate by the means on the fixed part when the shaft is rotating above said predetermined rate; and spring means biasing the said plate toward the said brake means.